| United States Patent [19]
Ikekawa et al.

[11] 3,846,455
[45] Nov. 5, 1974

[54] PROCESS FOR THE PREPARATION OF 25-HYDROXY-CHOLESTEROL AND ESTERS THEREOF
[75] Inventors: Nobuo Ikekawa; Masuo Morisaki, both of Tokyo, Japan
[73] Assignee: Eisai Co., Ltd., Tokyo, Japan
[22] Filed: May 21, 1973
[21] Appl. No.: 362,506

[30] Foreign Application Priority Data
May 22, 1972 Japan.............................. 47-49879
May 22, 1972 Japan.............................. 47-49880

[52] U.S. Cl. ............................................ 260/397.2
[51] Int. Cl. ........................................ C07c 169/54

[58] Field of Search..... Machine Searched Steroids

*Primary Examiner*—Henry A. French
*Attorney, Agent, or Firm*—Wenderoth, Lind & Ponack

[57] ABSTRACT

Improvement in a process for the preparation of 25-hydroxycholesterol and esters thereof, starting from fucosterol-24(28)-epoxide or esters thereof derived from fucosterol contained in Fucus, a kind of sea weeds, and through the steps of intermediately producing desmosterol and the corresponding epoxide; the resulting 25-hydroxycholesterol and esters thereof being useful for the production of active vitamin $D_3$.

1 Claim, No Drawings

PROCESS FOR THE PREPARATION OF 25-HYDROXY-CHOLESTEROL AND ESTERS THEREOF

This invention relates to a process for the production of 25-hydroxycholesterol and ester thereof. This invention also concerns a process for the production of desmosterol, its ester, as well as desmosterol-24(25)-epoxide and its ester, which serve as intermediates for the production of the aforementioned 25-hydroxycholesterol and ester thereof.

More precisely, the process of the present invention consists essentially of a combination of the steps of a. the formation of desmosterol or esters thereof by treating fucosterol-24(28)-epoxide or esters thereof with stannic chloride;

b. the formation of desmosterol-24(25)-epoxide or 3-esters thereof by treating the desmosterol or esters thereof obtained by the preceding step, with a perorganic acid; and, c. the formation of 25-hydroxycholesterol or its 3-ester as the final product by treating the desmosterol-24(25)-epoxide or 3-ester thereof obtained by the above step (b), with a complex compound of an alkali-metal hydride and, if desired, further reacting the resulting 25-hydroxycholesterol with an esterifying agent.

It is known that 25-hydroxycholesterol and its 3-esters are the commercially useful intermediates which serve as the starting material for the production of 25-hydroxycholecalciferol, the active vitamin $D_3$, since the latter is readily derivable from said 25-hydroxycholesterol and its 3-ester by brominating to 7-bromo derivatives thereof followed by dehydrobromination to the corresponding 7-dehydro compound and further by subjecting the latter to ultraviolet irradiation in accordance with the conventional art.

As of the method for preparing 25-hydroxycholesterol, there are known the method reported by A. I. Ryer, et al., in *Journal of the American Chemical Society*, 72 (1950), 4247, and the method developed by W. G. Dauben et al. in *Journal of the American Chemical Society*, 72 (1950), 4248.

The A. I. Ryer et al. method is directed to a production of 25-hydroxycholesterol by reacting methylmagnesium iodide with 3β-acetoxy-5-cholesten-25-one, while the W. G. Dauben et al. method resembles the former method with the exception that 3β-hydroxy-5-cholesten-25-one, i.e., nor-cholestenol-25-one is employed as the starting material which contains the free hydroxyl group at the 3β-position instead of the acetoxy group of the former compound. Nor-cholesterol-25-one used as the starting material is usually obtained by oxidation of cholesterol. The disadvantage of these known methods, however, is in the fact that not only yield of the purposed nor-cholesterol-25-one is poor, but there is also a difficulty in the isolation of said compound in pure form from the various oxidation products which require many troublesome procedures.

Accordingly, these methods are not adapted to commercial practice, because of the difficulty in obtaining a large amount of the product as the starting material.

The object of the present invention is to provide a novel process for the production of 25-hydroxycholesterol on a commercial scale starting from a raw material which is abundantly available from a natural source.

Fucosterol-24(28)-epoxide or its 3-ester, which is used as the starting material in carrying out the process of the present invention, is readily obtained in a good yield by treating fucosterol, or 3-ester thereof, with a perorganic acid. The fucosterol is readily isolated from Fucus, a kind of sea weed, wherein the fucosterol is contained abundantly (about 0.18 percent).

Desmosterol which serves as the intermediate product in carrying out the process of the present invention is a substance which had been isolated by Stokes et al., Journal of Biological Chemistry, 220 (1956), 415, from the embryo of hens or the skin of rats, and has the chemical formula:

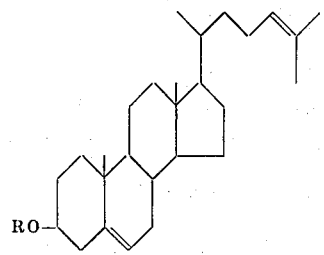

II

Desmosterol is an essential intermediate for biosynthesis of cholesterol and is broadly employed as an essential material for research on lipoid-metabolism.

Unfortunately, a suitable natural source or a synthetic process to obtain said desmosterol is hitherto unknown.

We previously reported in *Chemical Communication*, (1971), 1498, that demosterol was formed by reacting m-chloro perbenzoic acid with fucosterol or the 3-acetate thereof to obtain fucosterol-24(25)-epoxide or 3-acetate thereof at about a 60–75 percent yield, and then treating the resulting product with boron trifluoride etherate.

This process, however, is not satisfactory because the second step thereof simultaneously produces a large amount (about 45 percent) of 3β-hydroxystigmast-5-en-28-one or 3-acetate thereof as a by-product, and accordingly, the yield of a desmosterol or its 3-acetate is only 30–35 percent.

According to the process of this invention, desmosterol or its 3-ester is obtained in the first step at a yield as high as about 50 percent or more by reacting stannic chloride with fucosterol-24(28)-epoxide or 3-ester thereof.

The reaction sequence of the process of this invention may schematically be illustrated by the formulas:

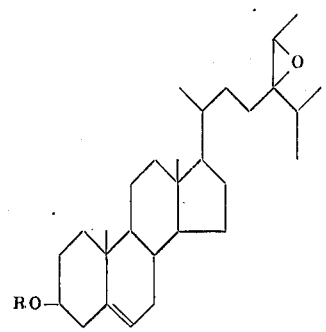

I

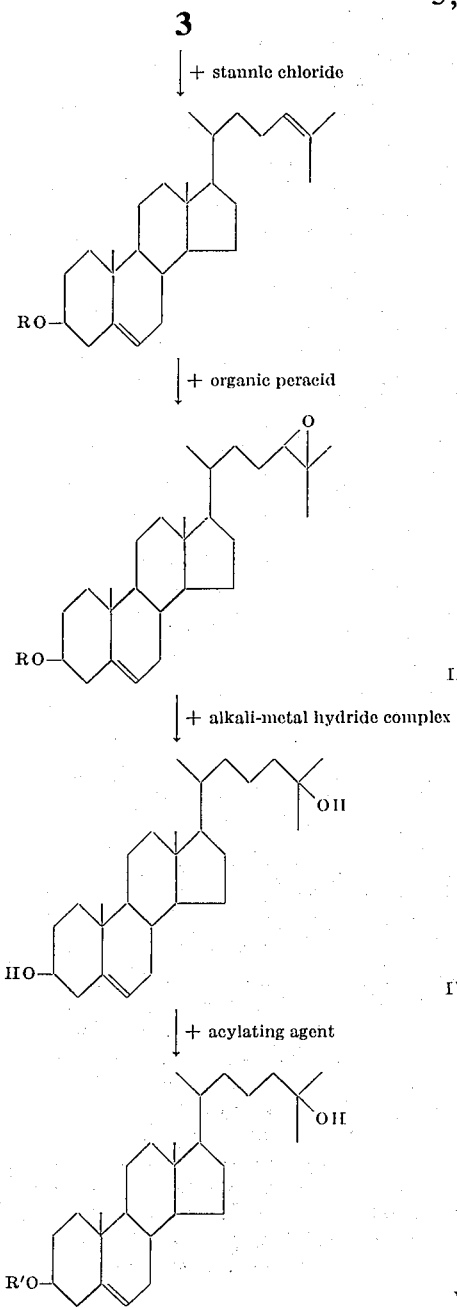

In the above formulas, R designates a hydrogen atom or an acyl group and R' designates an acyl group.

In the above reaction sequence the first step is conducted by dissolving fucosterol-24(28)-epoxide or 3-ester thereof represented by the formula (I) in an inert solvent such as benzene, hexane or the like, and adding stannic chloride to the resulting solution.

Although the temperature is not critical for the performance of the reaction, room temperature is preferable from an economical viewpoint. Isolation and purification of the resulting reaction product may easily be effected in accordance with conventional procedures such as removal of the solvent by distillation from the reaction mixture, and through column chromatography, recrystallization and the like.

In the second step of the reaction sequence, a perorganic acid dissolved in an organic solvent is added to a solution of demosterol or its 3-ester (II) in an organic solvent. Any of the organic solvents may be used in this reaction so far as the they are not concerned with the reaction. Chloroform, benzene and the like may be mentioned as preferable solvents.

As suitable organic peracids to be used in carrying out the second step of this invention, there may be exemplified perbenzoic acid halogen-substituted benzoic peracid such as m-chlorobenzoic peracid; monoperphthalic acid and the like.

After completion of the reaction in the second step, desmosterol-24(25)-epoxide or its 3-ester of the formula (III) may be recovered from the reaction mixture by means of the usual isolation procedures involving washings, and evaporation of the solvent. The resulting reaction product may further be purified by a conventional method such as recrystallization, column chromatography and the like. Such purification step is, however, not necessarily required, when the product is employed for the subsequent step of chemical reaction to produce 25-hydroxycholesterol of the formula (IV).

In the third step of this invention for the preparation of 25-hydroxycholesterol of the formula (IV), desmosterol-24(25)-epoxide or 3-esters thereof having the formula (III) dissolved in an organic solvent is reacted with an alkali metal hydride complex dissolved in an organic solvent. Although the reaction temperature is not critical, room temperature is preferable from an economic standpoint.

Any of the organic solvents may be used in the above reaction, so far as they do not enter into the contemplated reaction. As suitable solvents, there may be mentioned, for example, ethyl ether, tetrahydrofuran and the like.

As for the alkali and metal hydride complex, there may be mentioned lithium aluminium hydride (Li Al $H_4$), sodium (bis-2-methoxy-ethoxy) aluminium hydride [Na Al $H_2(OCH_2CH_2O$ $Ch_3)_2$] and the like.

When the reaction is completed, the reaction mixture is washed with water and the solvent is removed by evaporation. There is thus obtained the contemplated 25-hydroxycholesterol having the formula (IV). The resulting compound may be purified in accordance with a conventional purification method such as recrystallization, chromatography and the like.

Resulting 25-hydroxycholesterol, if desired, may be converted into 3-ester thereof having the formula (V) by a usual esterification step wherein, an acid anhydride together with pyridin, for example, is employed as esterifying agent.

The following Examples are further illustrative of the invention.

EXAMPLE 1

3 Grams of fucosterol-24(28)-epoxide-3-acetate were dissolved in 60 mls. of benzene. To the solution were added 3 mls. (40-times molar proportion) of stannic chloride and the mixture was allowed to stand at room temperature for one hour. The reaction mixture was then washed with a saturated aqueous solution of sodium bicarbonate and water, dried on anhydrous sodium sulfate, and evaporated to dry. The residue was charged on 90 grams of silica gel column. By eluting the column with a mixture of n-hexane and benzene (5 : 1), there was obtained 1.5 grams of desmosterol-3-acetate.

To 1.5 grams of the resulting desmosterol-3-acetate dissolved in 30 mls. of chloroform was added drop by drop under stirring and ice-cooling, 550 mg of m- chloro perbenzoic acid dissolved in 30 mls. of chloroform for 45 minutes.

After completion of the addition of the peracid solution, the reaction mixture was washed with 1 N sodium hydroxide aqueous solution followed by water. The solvent was then removed by distillation, and there was obtained 1.6 grams of the reaction product which contained desmosterol-24(25)-epoxide acetate.

The product without purification was dissolved in 50 mls. of ethyl ether. To the etheral solution was added drop by drop an etheral solution (50 mls.) of 800 mgs. of lithium aluminium hydride. The reaction mixture was stirred at room temperature for 20 minutes, and there was added drop by drop ethyl ether saturated with water. The etheral layer was separated, dried on anhydrous sodium sulfate and the solvent was evaporated. There was obtained 1.38 grams of the reaction product which contained 25-hydroxycholesterol.

The product of the preceding reaction step was dissolved in a mixture of 20 mls. of pyridin and 10 mls. of acetic anhydride and the solution was allowed to stand overnight at room temperature.

The reaction mixture was poured onto ice water and ether was added thereto. The etheral solution was washed successively with 1 N hydrochloric acid, a saturated aqueous solution of sodium bicarbonate and water. The etheral layer was dried on anhydrous sodium sulfate, and the solvent was distilled off. The resulting reaction product was carried on a column of 100 grams of silica gel and the column was eluted with a mixture of benzene and n-hexane (5 : 1). There was obtained from the eluted solution, 650 mgs. of 25-hydroxycholesterol 3-acetate having the melting point of 136°–137°C.

What is claimed is:

1. A process for the preparation of 25-hydroxycholesterol or an ester thereof comprising:

1. reacting stannic chloride with fucosterol-24(28)-epoxide or an ester thereof represented by the formula

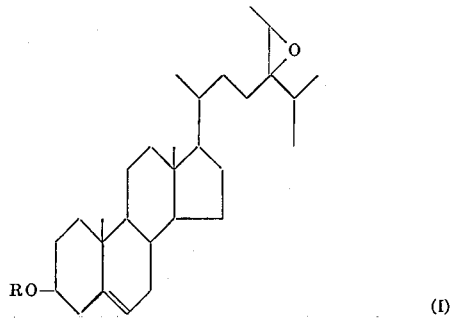

(I)

wherein R designates a hydrogen atom or an acetyl radical to obtain desmosterol or an ester thereof represented by the formula

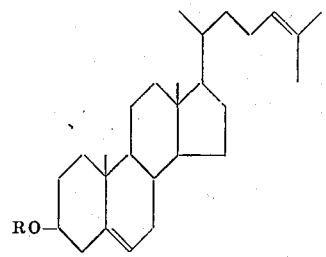

(II)

wherein R has the same meanings as those defined in the above formula (I);

2. reacting a perorganic acid selected from the group consisting of perbenzoic acid, m-chloro perbenzoic acid and mono-perphthalic acid with the desmosterol or ester thereof of the formula (II) to obtain desmosterol-24(25)-epoxide having the formula

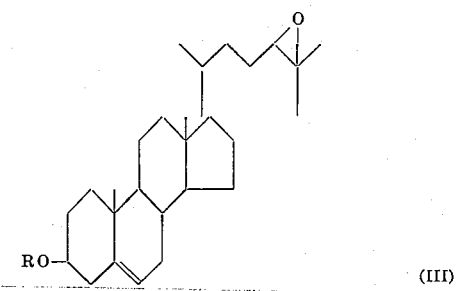

(III)

wherein R has the same meanings as given in formula (I); and 3. reacting an alkali metal hydride complex selected from the group consisting of lithiu- aluminum hydride and sodium (bis-2-methoxy-ethoxy) aluminum hydride with the desmosterol-24(25)-epoxide having the formula (III) to obtain 25-hydroxycholesterol represented by the formula

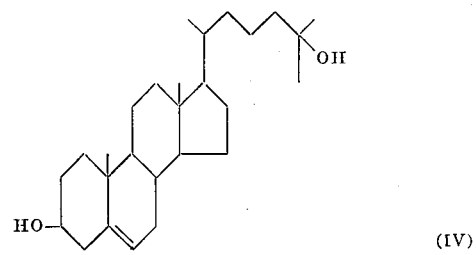

(IV)

and, if necessary, further treating the 25-hydroxycholesterol with acetic anhydride to obtain the corresponding ester thereof.

* * * * *